March 5, 1963 A. KEEFE 3,079,940
INFLATION STEM VALVE
Filed May 26, 1961

INVENTOR.
ARTHUR KEEFE
BY Louis Candela
ATTORNEY

United States Patent Office 3,079,940
Patented Mar. 5, 1963

3,079,940
INFLATION STEM VALVE
Arthur Keefe, 56 Broad St., Akron, Ohio
Filed May 26, 1961, Ser. No. 112,838
2 Claims. (Cl. 137—223)

This invention relates, in general, to inflation valves. More particularly, this invention relates to inflation valves utilized with a valve stem on pneumatic tires.

The kind of inflation valves presently used on the valve stems of inner tubes and rims generally associated with pneumatic tires are constructed from a combination of metal parts. In the main, metal component valves have been successful. However, due to the necessary number and precision of metal parts, such valves are relatively costly and subject to defects in service.

To eliminate the need of metal component valves, efforts have previously been made to substitute therefor inflation valves having an all rubber composition. But, in this regard, most of the prior art devices show such valves only in relation to a tire, inner tube, or rim especially constructed to utilize such prior art valves. Further, efforts have also been made toward the use of self healing composition surrounded in a casing of harder rubber in the manufacture of all rubber valves. While most of these devices have found some use in connection with football bladders and the like, their use, to this time, in connection with pneumatic tires is extremely limited.

It is, therefore, the primary object of this invention to provide an all rubber inflation valve.

A further object is to provide such a valve which may be used in connection with pneumatic tires while not requiring their special construction.

Another object is to provide an inflation valve located for use in the same manner as are the conventional valve stems presently associated with inner tubes and rims on conventional pneumatic tire constructions.

These and other objects will become more apparent upon a reading of the following brief specification, considered and interpreted in the light of the accompanying drawings, in which.

Figure 1:
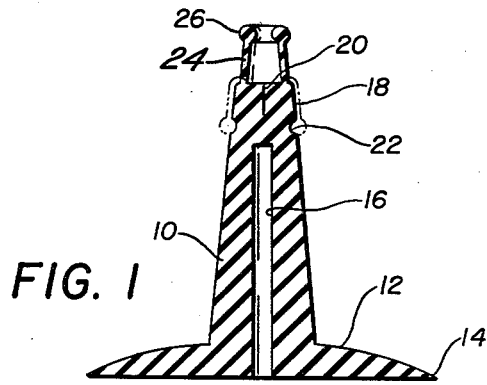
FIGURE 1 is a view in cross section of the novel inflation valve of this invention.

Referring now to FIGURE 1 of the drawings, there is illustrated a particular embodiment of the novel inflation valve designed for adaptability to pneumatic tire inner tubes. To accomplish this purpose, a stem 10 terminates at one longitudinal end in a flange 12. The flange 12 is gradually reduced in thickness to produce a feathered edge 14. By use of this flange, as is well known in the art, the valve may be vulcanized to an inner tube with the air needle passageway 16 opening into the interior of the inner tube to permit the introduction of air therein. Passageway 16 is disposed longitudinally within stem 10 so as to communicate with the opposed longitudinal end 18 of the stem. End 18, as is the whole stem, is made of a soft, resilient type rubber or rubber like material such as will permit the insertion therethrough of an air inflation needle. To this end, a slit 20 is provided to aid the introduction of the needle. The end 18 is also provided with an annular groove 22 and an integral, circular rubber wall 24 carrying a pressure ring 26 for purposes which will hereinafter be described.

Figure 2:
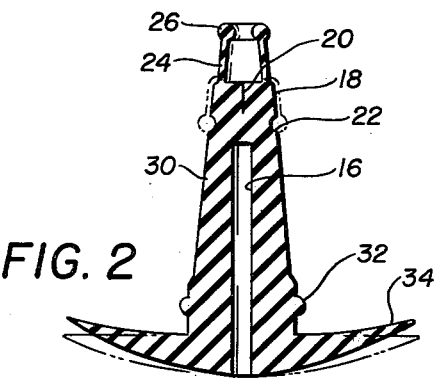
FIGURE 2 is a view in cross section similar to FIGURE 1 but showing the valve adapted for use on a pneumatic tire rim.

The valve illustrated in FIGURE 2 is adapted for use on a tire rim such as is quite common in the mounting of tubeless pneumatic tires. The end 18 is constructed exactly as is the end 18 of FIGURE 1 and, consequently, like reference numerals designate like parts. To facilitate the use of the valve as intended, stem 30 is shown as having a flange 32 longitudinally spaced from an end flange 34. In normal condition, flanges 32 and 34 converge toward each other. The valve is inserted into a suitable bore on a rim, preferably from the inside with the flange 32 being distorted while passing through the bore and flange 34 flattening out to the dotted line position of FIGURE 2 against the inside surface of the rim. In this manner, passageway 16 opens to the interior of a tubeless tire mounted on a rim to effect the inflation thereof.

During operation of the valve described, wall 24 and pressure ring 26 are extended outwardly by hand and folded downwardly so that wall 24 envelops the external wall of end 18 and ring 26 is engaged in the groove 22. Wall 24 is less in cross section or circumferential dimension than is the external wall of end 18. Likewise, ring 26 is less in cross section or circumferential dimension than is groove 22. Therefore, a constant pressure is exerted transversely of or from the external wall toward the longitudinal center of end 18. An air inflation needle is then inserted into slit 20 and hand forced through the resilient material of end 18. During this insertion, a slight outward bulging of end 18, wall 24, and ring 26 will occur. When the air inflation needle has entered into the passageway 16, air under pressure may be introduced for inflation of an inner tube or tubeless tire in well known manner. When the needle is withdrawn, the aforementioned inwardly directed pressures exerted by wall 24 and ring 26 will cause the effective closure of the opening made by the passage of the air needle through end 18. The pressures exerted are great enough to maintain the effected closure against the normal tendencies of air leakage or seepage during service of the bodies so inflated.

Figure 3:
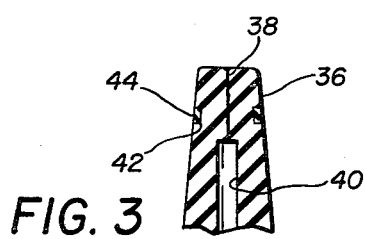
FIGURE 3 is a partial view in cross section showing a modification of the novel valve.

FIGURE 3 illustrates a modified form of the valve. The closed end 36 of a resilient material has a slit 38 for aiding the passage of an air needle through the end 36 to the air passageway 40. An annular groove 42 receives a pressure ring 44. The ring, in this modification, is placed in position by means of a hollow tool. The ring 44 is first placed on the outside surface of the tool with the tool being then inserted over the end 36 and the ring 44 slid off the tool into engagement with the groove 42. Ring 44 will exert an inwardly directed pressure through the same means as previously described. In use, operation of this modified valve will be the same as has also been previously described.

Figure 4:
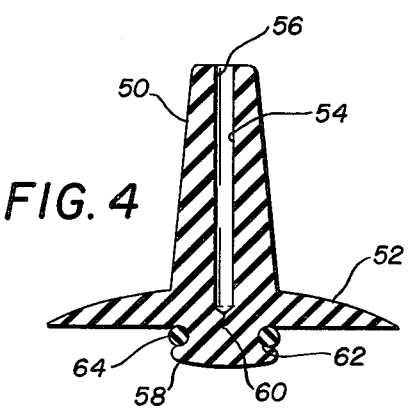
FIGURE 4 is a view in cross section showing another modification of the valve.

FIGURE 4 illustrates a modification of the novel inflation valve for use on an inner tube. To this end, a stem 50 is provided with a flange 52 for attachment to an inner tube in well known manner. However, as will be quite readily recognized from viewing FIGURE 4, the air needle passageway 54 will open, as at 56, on the longitudinal end of the stem protruding away from the inner tube or on the end which will be available to those using an inflation medium. The opposed longitudinal end 58 is in a closed, bulbous form and is composed of a soft, resilient rubber or rubber like material. The slit 60 aids the communication between passageway 54 and the end 58. The bulbous form of the end 54 defines a groove 62 which receives a pressure ring 64 for purposes which are or will become evident.

Figure 5:
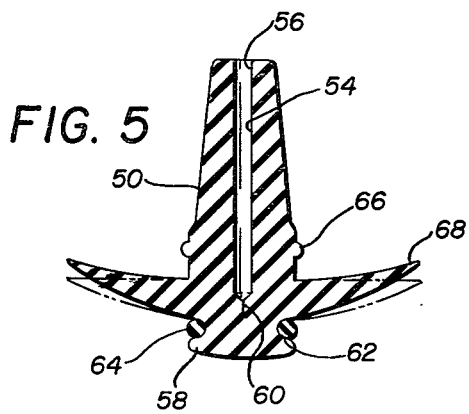
FIGURE 5 is a view in cross section similar to FIGURE 4 but showing the valve adapted for use on a pneumatic tire rim.

The embodiment illustrated in FIGURE 5 is similar to the modification of FIGURE 4 except that the stem 50 thereof is adapted for use on a tire rim. To this end, flanges 66 and 68 are provided to perform in the same manner as described in connection with the flanges 32 and 34 of FIGURE 2.

When the inflation valves of FIGURES 4 and 5 are placed in position on their associated inner tube or tire rim, the closed end 58 will be disposed interiorly of the air cavity or chamber to be inflated, the pressure ring 64 having been previously engaged to the groove 62 by means of a suitable tool as above described. An air needle may then be inserted into the opening 56, freely moved in the passageway 54 to the slit 60, and hand forced through the closed end 58 to introduce the air inflation needle and inflating medium to the desired inflation chamber. Here, again, the ring 64 in normal condition is less in cross section or circumferential dimension than is the groove 62 and will constantly exert a pressure toward the longitudinal center of the stem 50. Hence, when the air needle is withdrawn after sufficient air pressure has been achieved, the opening made by the passage of the air needle through the end 54 will be effectively closed to prevent loss of air pressure through seepage or leakage. Any suitable, removable cap or plug (not shown) may be inserted into the opening 56 to prevent collection of dust, dirt, or other debris in the passageway 54 during service of the bodies so inflated.

Figure 6:
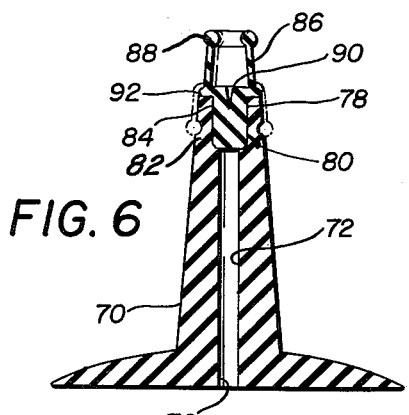
FIGURE 6 is a view in cross section showing a further modification of the novel valve.
Figure 7:
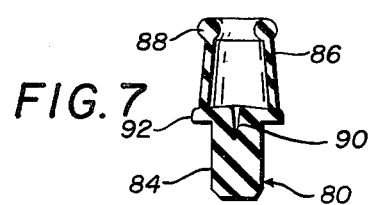
FIGURE 7 is a view in cross section showing the valve plug of FIGURE 6.

In present practice, it is customary to vulcanize a valve stem with an inner tube at the same time that the inner tube is undergoing vulcanization. It is, therefore, necessary that the valve stem have a through longitudinal passageway therein to permit entry of the vulcanization mediums. It is only after the vulcanization of the valve stem with the inner tube that the conventional metal component valves are attached to one end of the valve stem. With these factors in mind, a modification of the novel inflation valve of this invention is illustrated in FIGURE 6. A stem 70 having an annular groove 82 formed therein near the upper or top portion thereof is shown as having a through longitudinal passageway 72. End 76 of the passageway 72 opens into the interior of the inner tube while the opposed end 78, also open, receives a valve plug 80. The said plug is formed of soft rubber or rubber like material and consists of a solid body portion having a slit 90 in and a flange 92 formed on the top portion thereof. Extending upwardly from said flange and formed integrally therewith is a sleeve 86 cylindrical in cross-section and having an integral pressure ring 88 formed on the free end thereof. Plug 80 is inserted into the open end 78 and hand forced into passageway 72 until the flange 92 thereon contacts the end of stem 70, as is clearly illustrated in FIGURE 6. Body portion 84 is greater in cross section or circumferential dimension than is the circumferential dimension of passageway 72. Frictional forces created during positioning may adequately maintain plug 80 in its desired position relative to passageway 72 but a suitable cement, if desired, may be used to assure adherence. Rubber wall 86 and pressure ring 88 may be extended outwardly by hand and moved downwardly so that rubber wall 86 envelops the external surfaces at the one longitudinal end of stem 70 and ring 88 becomes engaged with the groove 82. Ring 88 will exert a constant pressure toward the longitudinal center of the plug 80 for the same reasons already discussed in reference to the other embodiments of this invention. Also, use and operation of the valve of FIGURE 6 should be self-evident following, as it does, the previous descriptions of use and operation herein given.

Referring again to the modification of FIGURE 3, attention is drawn to the fact that the slit 38 therein extends completely through the end 36 to the passageway 40. If desired, the various slits shown in the several illustrations may, in like manner, be through slits without in any way affecting the use and operation of the embodiments described.

There has been shown, then, a novel inflation valve which in size and shape is not unlike the valve stems presently in use on conventional tire constructions. For this intended reason, the novel inflation valve of this invention may be located for use exactly as are the conventional valve stems. Therefore, this invention does not require the special construction of inner tubes, tires, or rims. The all rubber construction and the use of a closed end of a soft, resilient rubber or rubberlike composition with the pressure means indicated produces an effective valve means without resort to metal parts.

While a full and complete description of the invention has been set forth, it is to be understood that the invention is not intended to be so limited. Accordingly, modifications may be resorted to without departing from the spirit hereof or the scope of the appended claims.

What is claimed is:

1. A valve for inflatable articles fabricated of resilient material comprising a stem provided with (1) a flange on one end thereof; (2) a flexible open ended cylindrical extension on its other end; (3) an air needle passageway open at said flanged end and terminating at a closed portion of said stem adjacent said extension, and (4) a circular groove formed in said stem adjacent said extension; the said extension having a ring on the free edge thereof, the formation being such that an air needle may be inserted through the closed portion of said stem into said passageway to inflate the article to which the stem may be attached and, when said needle is withdrawn, the flexible portion of said stem may be folded down over the end of said stem to which said flexible portion is attached to cause the said ring to fall into said groove to close the opening in the closed portion of said stem caused by said needle.

2. A valve for inflatable articles fabricated of rubber like material comprising a stem provided with (1) a body portion having an air passageway therethrough; (2) a flexible open ended cylindrical extension on one end thereof, and an insertable plug in the end of said stem to which said extension is attached; the said extension being provided with a circular ring on the free edge thereof, and the said stem being provided with a circular groove for receiving said ring, the arrangement being such that an air needle may be inserted through said plug into said passageway to inflate the article to which the stem may be attached and, when said needle is withdrawn, the flexible portion of said stem may be folded downwardly over said stem to cause said ring to fall into said groove to thereby close the opening in said plug caused by said needle.

References Cited in the file of this patent

UNITED STATES PATENTS

| | | |
|---|---|---|
| 2,064,695 | Sipe | Dec. 15, 1936 |
| 2,387,455 | McDermott | Oct. 23, 1945 |
| 2,600,862 | Fenton | June 17, 1952 |
| 2,710,623 | Kolos | June 14, 1955 |